(12) United States Patent
Moon et al.

(10) Patent No.: US 10,933,776 B2
(45) Date of Patent: Mar. 2, 2021

(54) FOLD AND DIVE SEAT FOR VEHICLE

(71) Applicants: Hyundai Motor Company, Seoul (KR); Kia Motors Corporation, Seoul (KR); DAECHANG SEAT CO.,LTD-DONGTAN, Hwaseong-si (KR); HYUNDAI TRANSYS INC., Seosan-si (KR)

(72) Inventors: Hyun Kyu Moon, Gyeonggi-do (KR); Chan Ho Jung, Gyeonggi-do (KR); Seon Chae Na, Gyeonggi-do (KR); Sang Beom Hwang, Seoul (KR); In Chang Hwang, Gyeonggi-do (KR); Myung Soo Lee, Gyeonggi-do (KR); Jeong Soo Kim, Busan (KR); Eom Seok Yoo, Gyeonggi-do (KR)

(73) Assignees: Hyundai Motor Company, Seoul (KR); Kia Motors Corporation, Seoul (KR); DAECHANG SEAT CO., LTD-DONGTAN, Gyeonggi-do (KR); HYUNDAI TRANSYS INC., Chungcheongnam-do (KR)

( * ) Notice: Subject to any disclaimer, the term of this patent is extended or adjusted under 35 U.S.C. 154(b) by 0 days.

(21) Appl. No.: 16/521,203

(22) Filed: Jul. 24, 2019

(65) Prior Publication Data
US 2020/0307420 A1    Oct. 1, 2020

(30) Foreign Application Priority Data

Mar. 25, 2019   (KR) ........................ 10-2019-0033291

(51) Int. Cl.
*B60N 2/06*   (2006.01)
*B60N 2/12*   (2006.01)
(Continued)

(52) U.S. Cl.
CPC ............. *B60N 2/23* (2013.01); *B60N 2/0284* (2013.01); *B60N 2/07* (2013.01); *B60N 2/2245* (2013.01); *B60N 2/0232* (2013.01)

(58) Field of Classification Search
CPC .......... B60N 2/0284; B60N 2/07; B60N 2/23; B60N 2/2245
(Continued)

(56) References Cited

U.S. PATENT DOCUMENTS 6,152,533 A * 11/2000 Smuk ....................... B60N 2/12
                                                    297/378.12 X
6,698,835 B2 * 3/2004 Kojima ................ B60N 2/0881
                                                    297/331 X
(Continued)

FOREIGN PATENT DOCUMENTS

JP    2011073472 A1   4/2011
JP    5125617 B2      1/2013
(Continued)

*Primary Examiner* — Rodney B White
(74) *Attorney, Agent, or Firm* — Mintz Levin Cohn Ferris Glovsky; Peter F. Corless

(57) ABSTRACT

A fold and dive seat for a vehicle that achieves a fatigue reduction posture is provided. The seat includes a tip up-extension mechanism that enables tipping-up and extension of the front end of a seat cushion and a seatback reclining mechanism for the fold and dive seat so that tipping-up for lifting the front end of the seat cushion and extension for extending the front end forward are performed simultaneously performed when the seatback reclining is performed.

10 Claims, 7 Drawing Sheets

(51) Int. Cl.
   *B60N 2/18*     (2006.01)
   *B60N 2/20*     (2006.01)
   *B60N 2/30*     (2006.01)
   *B60N 2/36*     (2006.01)
   *B60N 2/23*     (2006.01)
   *B60N 2/02*     (2006.01)
   *B60N 2/07*     (2006.01)
   *B60N 2/22*     (2006.01)

(58) Field of Classification Search
   USPC .................. 297/331, 334, 378.12, 378.14
   See application file for complete search history.

(56) References Cited

U.S. PATENT DOCUMENTS

| | | | | |
|---|---|---|---|---|
| 7,497,517 B2* | 3/2009 | Gundall | ................ | B60N 2/206 |
| | | | | 297/334 X |
| 8,038,217 B2* | 10/2011 | Yamagishi | ........... | B60N 2/3013 |
| | | | | 297/378.12 X |
| 8,047,610 B2* | 11/2011 | Yamagishi | ............... | B60N 2/36 |
| | | | | 297/334 X |
| 8,256,844 B2* | 9/2012 | Yamazaki | ............ | B60N 2/3065 |
| | | | | 297/378.12 |
| 8,439,444 B2* | 5/2013 | Ngiau | ..................... | B60N 2/12 |
| | | | | 297/378.12 |
| 8,585,147 B2* | 11/2013 | Calvert | ................ | B60N 2/3065 |
| | | | | 297/378.14 X |
| 8,590,970 B2* | 11/2013 | Takakura | ............... | B60N 2/305 |
| | | | | 297/334 |
| 8,602,495 B2* | 12/2013 | Jeong | ................... | B60N 2/3065 |
| | | | | 297/334 |
| 8,616,642 B2* | 12/2013 | Sung | .................... | B60N 2/3013 |
| | | | | 297/334 X |
| 8,882,197 B2* | 11/2014 | Line | ..................... | B60N 2/3093 |
| | | | | 297/334 |
| 10,647,227 B2* | 5/2020 | Poulos | ..................... | B60N 2/23 |
| 2003/0075394 A1* | 4/2003 | Shields | ................. | B60N 2/929 |
| | | | | 188/67 |
| 2004/0061371 A1* | 4/2004 | Tame | ................... | B60N 2/2352 |
| | | | | 297/378.12 |
| 2009/0322134 A1* | 12/2009 | Yamada | ............... | B60N 2/3013 |
| | | | | 297/334 X |
| 2013/0292982 A1* | 11/2013 | Radermacher | .......... | B60N 2/20 |
| | | | | 297/334 X |

FOREIGN PATENT DOCUMENTS

JP          5788216 B2      9/2015
KR      20180060402 A      6/2018

* cited by examiner

- RELATED ART -          - PRESENT DISCLOSURE -

FOLD AND DIVE SEAT FOR VEHICLE

CROSS-REFERENCE TO RELATED APPLICATION

This application claims under 35 U.S.C. § 119(a) the benefit of priority to Korean Patent Application No. 10-2019-0033291 filed on Mar. 25, 2019, the entire contents of which are incorporated herein by reference.

BACKGROUND

(a) Technical Field

The present disclosure relates to a fold and dive seat for a vehicle and, more particularly, to a fold and dive seat for a vehicle that enables the front end of a seat cushion to be simultaneously tipped up and extended when a seatback is reclined.

(b) Background Art

A fold and dive seat, which is a type of rear seat for a vehicle, has been developed to secure a space for loading objects and secure passages to allow passengers to enter and exit a vehicle. The fold and dive seat is a seat capable of performing a folding operation for folding a seatback over a seat cushion due to an insufficient loading space behind the seatback and a diving operation for lowering the front portion of the seat cushion to make the rear side of the folded seatback horizontal. The fold and dive seat is also fundamentally equipped with a mechanism for reclining the seatback rearward to achieve a fatigue reduction posture for passengers to rest, sleep, etc.

For reference, the fatigue reduction posture is a position that reduces fatigue and enables a passenger to feel comfortable by changing the angle of supporting the hips, thighs, calves, etc. into an angle being able to maximally distribute body pressure when the angle of supporting the upper body of the passenger is changed. However, the fold and dive seat includes a seatback reclining mechanism other than the fold and dive mechanism, to provide comfortability for a passenger to lean the upper body further back when the seatback is reclined, but the seat cushion remains fixed. Accordingly, the body pressure by the hips and thighs of the passenger is not distributed, thus increasing fatigue of the lower body. Therefore, there is a demand for a fold and dive seat capable of providing a fatigue reduction posture in which the body pressure by the passenger's upper body and lower body is distributed uniformly.

The above information disclosed in this section is merely for enhancement of understanding of the background of the disclosure and therefore it may contain information that does not form the prior art that is already known in this country to a person of ordinary skill in the art.

SUMMARY

The present disclosure provides a fold and dive seat for a vehicle capable of achieving a fatigue reduction posture, in which body pressure by the passenger's upper body and lower body maybe distributed uniformly, by mounting a tip up-extension mechanism enabling tipping-up and extension of the front end of a seat cushion other than a fold and dive mechanism and a seatback reclining mechanism for the fold and dive seat to simultaneously perform tipping-up for lifting the front end of the seat cushion and extension for extending the front end forward when the seatback reclining is performed.

In order to achieve the objects of the present disclosure, a fold and dive seat for a vehicle may include: a seat cushion frame; a seatback frame coupled to the seat cushion frame to be able to recline backwards; leverage links having an upper end fixed to the seatback frame and a lower end where a push stopper for pushing a first dive link is formed; second dive links fixed to sides of the seat cushion frame; first dive links having a lower end hinged to the second dive link and an upper end hinged to the leverage link; a fixed plate connected between seat rails at both sides thereof; a seat cushion support link having an upper end hinged to the second dive link and a lower end hinged to the fixed plate; a rail pipe mounted on the fixed plate and disposed in a front-rear direction under the seat cushion frame; a slider mounted on the rail pipe to be able to slide forward and backward; and a support link for tilting and hinged between the front end of the slider and the front end of the seat cushion frame.

The leverage link may have a vertical bending portion between the upper end fixed to a side of the seatback frame and the lower end where the push stopper is formed. Accordingly, the upper end of the first dive link may be disposed over and hinged to the inner side of the vertical bending portion and the push stopper may abut the rear surface of the first dive link to be able to push the first dive link. Additionally, return springs for assisting the seat cushion support link to return to an original position may be connected between the seat cushion support link and the seat rails.

The fold and dive seat may further include: a lever which is pullably (e.g., capable of being pulled) mounted on a side of the seat cushion frame; a linear locking device mounted on the slider to lock or unlock the slider on the rail pipe; and a cable connected between the lever and the linear locking device. When the lever is pulled, the cable is pulled and the linear locking device performs unlocking, and when the lever is released, the cable returns to the initial position and the linear locking device performs locking.

In particular, the linear locking device may include: an elastic clamp having a circular pipe shape with a side open by a slit and disposed between the outer side of the rail pipe and the inner side of the slider; and a pulling plate integrally formed at an end of the elastic clamp and extending to the outer side of the slider, and an inner end of the cable is coupled to the pulling plate. Additionally, stoppers configured to limit the positions before and after pulling of the pulling plate may be integrally formed on the outer side of the slider. Further, friction plates that abut or are spaced apart from the rail pipe may be disposed on the inner side of the elastic clamp. A reclining cable connected with a seatback reclining device may be connected to the lever to be able to be pulled.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
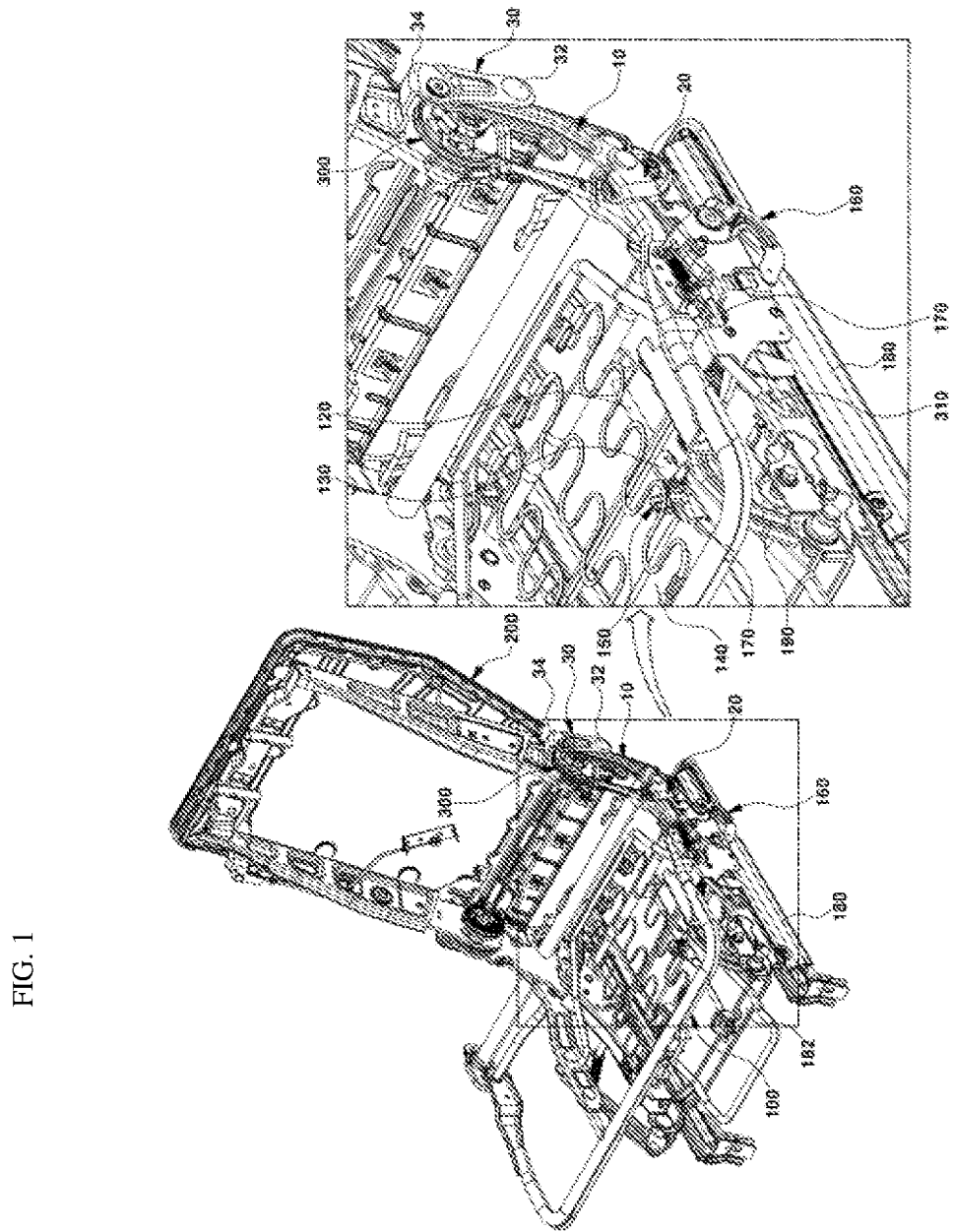
FIGS. 1 and 2 are perspective views showing a fold and dive seat for a vehicle according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 2:
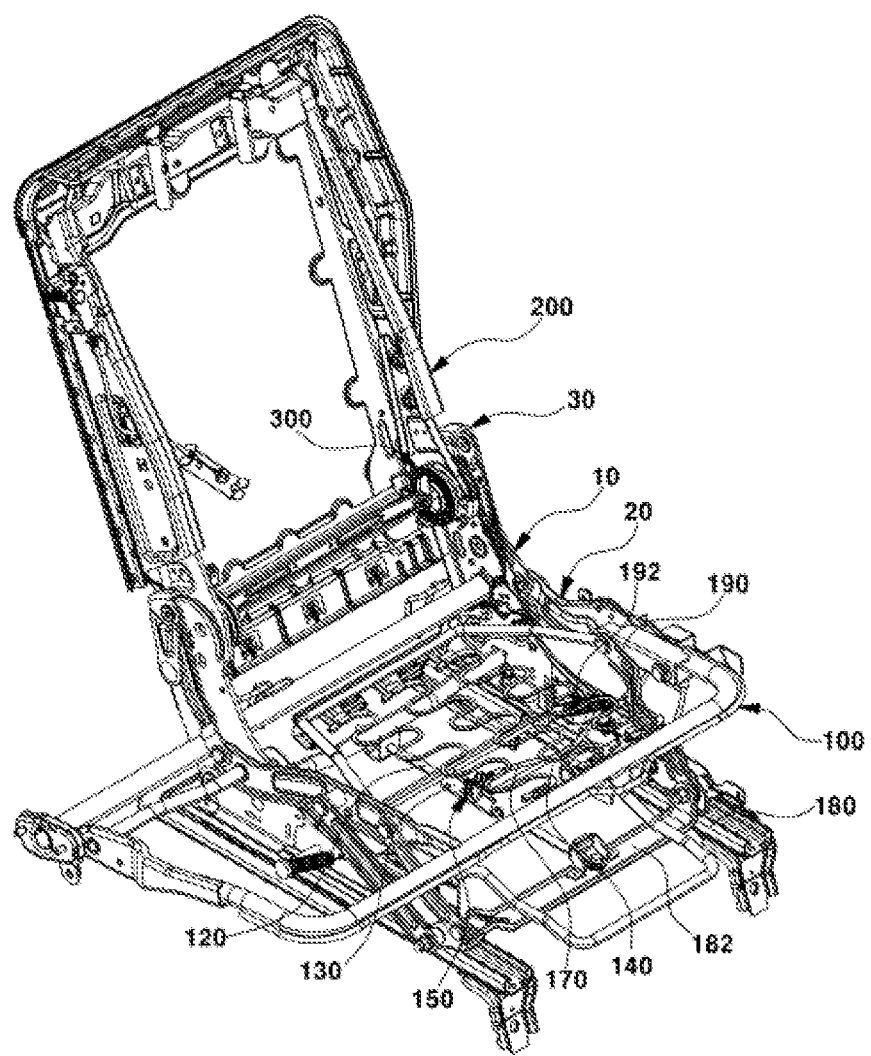

Hereinafter, exemplary embodiments of the present disclosure will be described in detail with reference to the accompanying drawings. FIGS. 1 and 2 are perspective views showing a fold and dive seat for a vehicle according to the present disclosure, in which reference numeral '100' indicates a seat cushion frame and reference numeral '200' indicates a seatback frame.

In particular, the seatback frame 200 may be coupled to the seat cushion frame 100 to be capable of reclining backwards. In other words, a well-known reclining device 300 may be mounted at the joint between the rear end of the seat cushion frame 100 and the lower end of the seatback frame 200, whereby the rear inclination angle of the seatback frame 200 maybe adjusted. The present disclosure is characterized in that tipping-up for lifting the front end of a seat cushion and extension for extending the front end forward may be performed simultaneously. Accordingly, the seat cushion frame 100 and the seatback frame 200 may be coupled to each other by leverage links 30, first dive links 10, and second dive links 20.

The upper end of the leverage link 30 may be fixed to the sides of the seatback frame 100 and a protrusive push stopper 32 for pushing the first dive link 10 forward may be formed at the lower end of the leverage link 30. The leverage link 30 may have a vertical bending portion 34 between the upper end fixed to the side of the seatback frame 100 and the lower end with the protrusive stopper 32 to prevent interference with the reclining device 300 and secure a space that overlaps the first dive link 10.

Accordingly, the upper end of the first dive link 10 may be disposed over and hinged to the inner side of the vertical bending portion 34 of the leverage link 30 and the push stopper 32 formed at the lower end of the leverage link 30 may abut the rear surface of the first dive link 10 to be able to push the first dive link 10 forward. Meanwhile, the second dive links 20 may be fixed to the sides of the seat cushion frame 100 by welding or other similar fastening method.

The first dive link 10 may be hinged between the leverage link 30 and the second dive link 20. In particular, the lower end of the first dive link 10 may be hinged to the rear end of the second dive link 20 and the upper end thereof may be hinged to the inner side of the vertical bending portion 34 of the leverage link 30. As other components for tipping-up and extension of the seat cushion frame 100 when the seatback frame 200 is reclined, a fixed plate 182 may be connected to seat rails 180 at both sides thereof under the seat cushion frame 100, a rail pipe 120 may be mounted and disposed in the front-rear direction on the fixed plate 182, and a slider 130 may befitted on the rail pipe 120 to be able to slide forward and backward.

A support link for tilting 140 that rotates vertically or horizontally may be hinged between the front end of the slider 130 and the bottom of the front end of the seat cushion frame 100. In other words, the support link for tilting 140 may include a front end rotatably hinged to the bottom of the seat cushion frame 100 and a rear end rotatably hinged to the front end of the slider 130. Further, seat cushion links 190, which are links for supporting the seat cushion frame 100 when the seat cushion frame 100 is tipped up and extended, may be connected between the second dive links 20 and the fixed plate 182.

In other words, the seat cushion link 190 may be disposed at an angle upward toward the rear and may have a lower end hinged to the fixed plate 182 and an upper end hinged to the inner side of the front portion of the second dive link 20. Additionally, return springs 192 may be connected between the seat cushion support link 190 and predetermined positions of sides of the seat rails 180 to assist the seat cushion frame 100 to return to an initial position after tilting up and extending.

Meanwhile, a linear locking device 150 that locks the slider 130 to prevent the slider 130 from moving along the rail pipe 120 or unlocks the slider 130 to move along the rail pipe 120 may be mounted on the slider 130. A lever 160 capable of being pulled for locking or unlocking the linear locking device 150 may be mounted on a side of the seat cushion frame 200. A cable 170 that transmits the pulling force applied to the lever 160 to the linear locking device 150 may be connected between the lever 160 and the linear licking device 150. Accordingly, when the lever 160 is pulled, the cable 170 may be pulled and the slider 130 locked by the linear locking device 150 may be unlocked. Further, when the pulled level 160 is released, the cable 170 may return to the initial position and the slider 130 may be locked by the locking device 150.

Figure 3A:
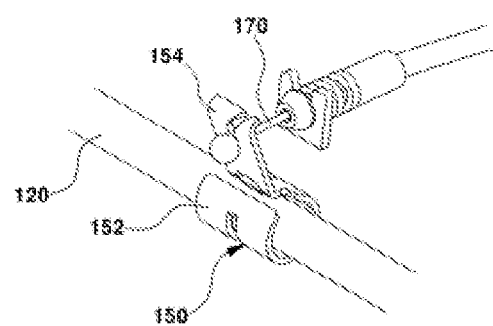
FIGS. 3A and 3B are perspective views showing a linear locking device of the fold and dive seat for a vehicle according to an exemplary embodiment of the present disclosure.
Figure 3B:
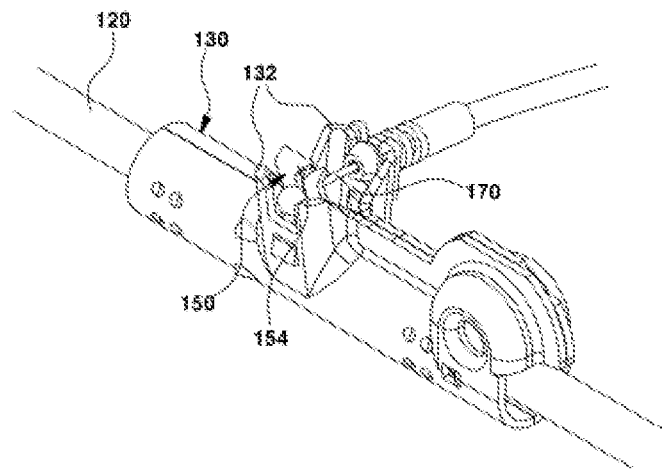
Figure 4A:
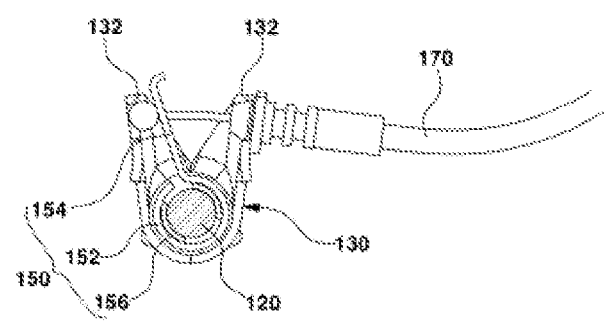
FIGS. 4A and 4B are perspective views showing an operation state of the linear locking device of the fold and dive seat for a vehicle according to an exemplary embodiment of the present disclosure.
Figure 4B:
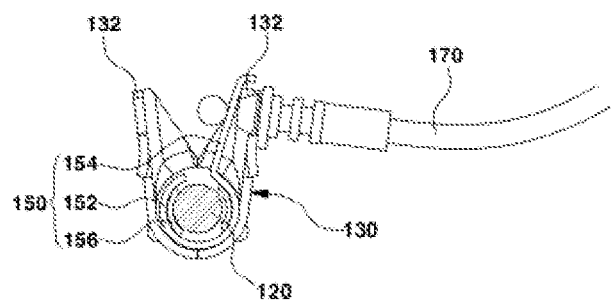

The configuration of the linear locking device 150 is described in more detail hereafter. FIGS. 3A and 3B are perspective view showing the linear locking device of the fold and dive seat for a vehicle according to the present disclosure and FIGS. 4A and 4B are perspective view showing an operation state of the linear locking device.

The linear locking device 150 may include an elastic clamp 152 having a circular pipe shape with a side open by a slit and disposed between the outer side of the rail pipe 120 and the inner side of the slider and a flat pulling plate 154 integrally formed at an end of the elastic clamp 150 and extending to the outer side of the slider 130. When the elastic clamp 150 opens and increases in diameter, the inner side of the elastic clamp 150 is spaced apart from the outer side of the rail pipe 120, to unlock the slider 130. Accordingly, the slider 130 may move along the rail pipe 120 together with the elastic clamp 150.

On the other hand, when the elastic clamp 150 is returned to an initial diameter by elastic restoring force, the inner side of the elastic clamp 150 may be tightened to the outer side of the rail pipe 120, to thus lock the slider 130. Accordingly, the slider 130 is unable to move along the rail pipe 120. Additionally, friction plates 156 that come in contact with (e.g., abut) or are spaced apart from the outer side of the rail pipe 120 may be disposed on the inner side of the elastic clamp 150. The friction plates 156 prevent the elastic clamp 150 from slipping and provide a strong fixing force to the elastic clamp 150 when the inner side of the elastic clamp 150 is tightened to come in contact with the outer side of the rail pipe 120.

An inner end of the cable 170 may be coupled to the front end of the pulling plate 154 protruding through the outer side of the slider 130 and the outer end of the cable 170 may be connected to the lever 160, as described above. A pair of stoppers 132 that limit the positions before and after pulling of the pulling plate 154 may be integrally formed in a V-shape on the outer side of the slider 130.

As shown in FIG. 1, a spring 162 that provides an elastic restoring force after the lever 160 is pulled may be connected between the front end of the lever 160 and a predetermined position on the seat cushion frame 100. Further, a reclining cable 310 connected with the reclining device 300 may be connected to the front end of the lever 160 to be able to be pulled, and thus, when the lever 160 is pulled, the cable 170 and the reclining cable 310 may be pulled.

The operational flow of the fold and dive seat having this configuration of the present disclosure is described hereafter.

Tipping-Up & Extension of Seat Cushion

Figure 5:
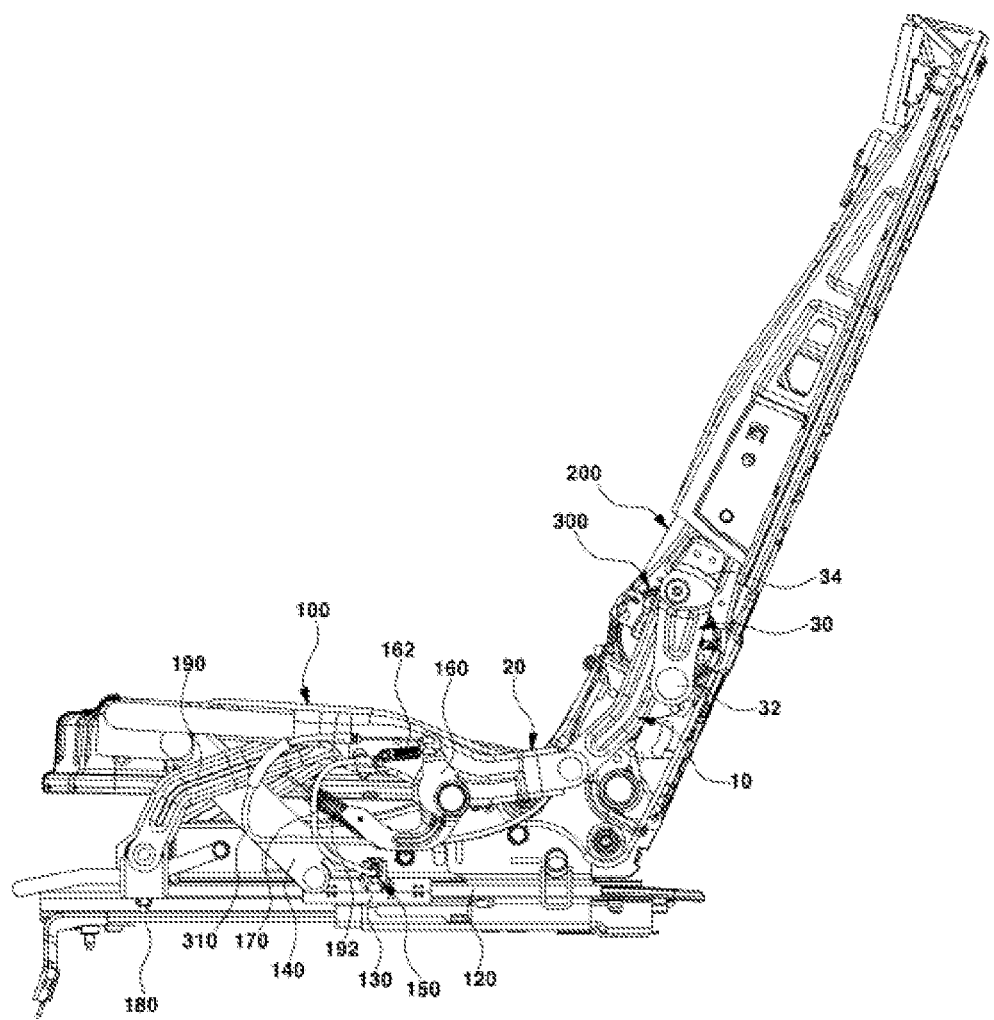
FIG. 5 is a side view showing a fundamental position of the fold and dive seat according to an exemplary embodiment of the present disclosure.
Figure 6:
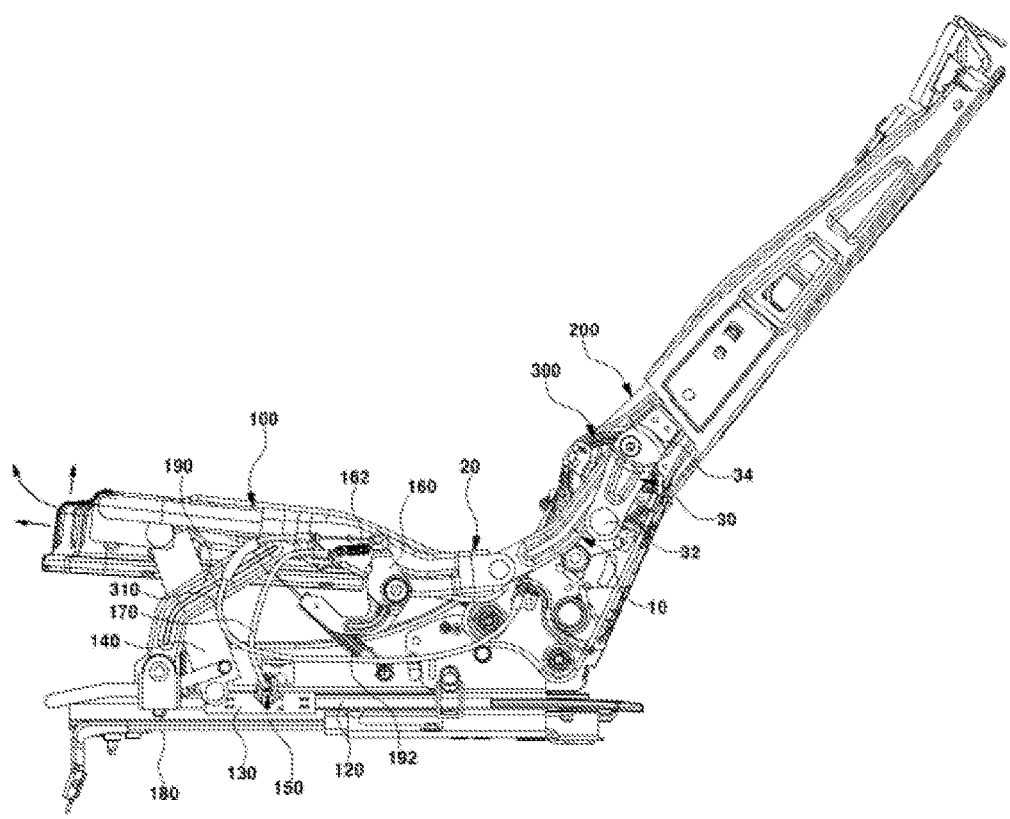
FIG. 6 is a side view showing the state when the seat cushion of the fold and dive seat according to an exemplary embodiment of the present disclosure has been tipped up and extended.

FIG. 5 is a side view showing a fundamental position of the fold and dive seat according to the present disclosure and FIG. 6 is a side view showing the state when the seat cushion of the fold and dive seat according to the present disclosure has been tipped up and extended.

First, when a passenger pulls the lever 160, the cable 170 and the reclining cable 310 may both be pulled. Further, as the cable 170 is pulled, the pulling plate 154 of the linear locking device 150 may be pulled, and thus, the pulling plate 154 may be moved from the pre-pulling position of FIG. 4A to a post-pulling position of FIG. 4B. The elastic clamp 150 integrally formed with the pulling plate 154 may open and increase in diameter, and thus, as shown FIG. 4B, the inner side of the elastic clamp 150 may be spaced apart from the outer side of the rail pipe 120.

Accordingly, the slider 130 may be unlocked and may move along the rail pipe 120 together with the elastic clamp 150. In particular, the linear locking device 150 including the elastic clamp 150 and the pulling plate 154 may move along the rail pipe 120 and the slider 130 surrounding the elastic clamp 150 may also move along the rail pipe 120. Since the reclining cable 310 may also be pulled when the lever 160 is pulled, the well-known reclining device 300 may also be unlocked and the seatback frame 200 maybe reclined backward.

When a passenger presses the seatback by leaning back against the seatback, as shown in FIG. 6A, the seatback frame 200 may be reclined backward by the reclining device 300, whereby the seatback is reclined. When the seatback frame 200 is reclined backward, the leverage links 30 may also be moved and reclined backward and the push stoppers 32 of the leverage links 30 push the first dive links 10 forward. In other words, the push stoppers 32 may be operated as lifting the first dive links 10.

Accordingly, the first dive links 10 may be rotated forward and upward (clockwise in FIG. 6A) about the hinged point on the third leverage link 30, and thus, the lower ends of the first dive links 10 may be pushed forward and moved upward. Further, the second dive links 20 hinged to the lower end of the first dive links 10 may second dive links 20 may also be pushed forward and moved upward. Therefore, extension in which the front end of the seat cushion frame 100 may be moved forward and tipping-up in which the front end is moved up may be performed simultaneously.

When the seat cushion frame 100 is pushed forward and moved upward, the support link for tilting 140 may be erected to pull the slider 130 forward, and thus, the slider 130 may be moved forward along the rail pipe 120 since it is unlocked, as described above. In this state, when the passenger releases the lever 160, the pulled cable 170 may be released and the elastic clamp 150 may be returned to an initial diameter by an elastic restoring force. Accordingly, the inner side of the elastic clamp 150 may be tightened to the outer side of the rail pipe 120 to be in close contact with (e.g., abut) the outer side, and thus, the slider 130 may be locked, and accordingly, reclining of the seatback and tipping-up and extension of the seat cushion may be completed.

As described above, since tipping-up in which the front end of the seat cushion is moved upward and extension in which the front end is stretched forward may be performed simultaneously when the seatback is reclined, whereby it may be possible to provide a fatigue reduction posture in which body pressure of the upper body and the lower body may be distributed more uniformly to the passenger.

Figure 7:
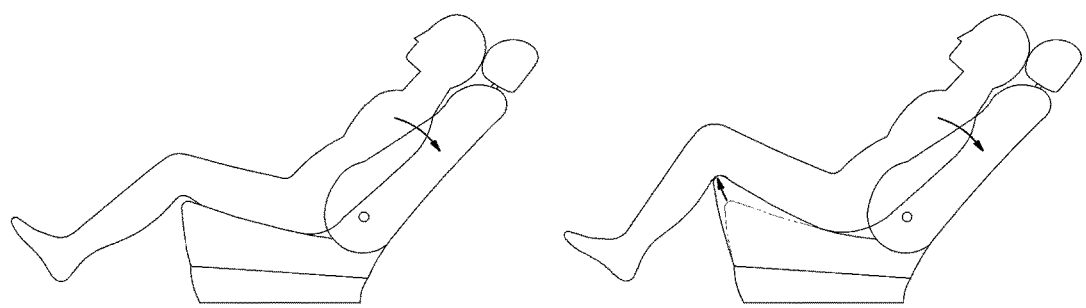
FIG. 7 is a view comparing a fatigue reduction posture for a passenger that is implemented by the fold and dive seat according to an exemplary embodiment of the present disclosure with an existing posture according to the related art.

Referring to FIG. 7, when a seatback is only reclined in the related art, a passenger may lean back against the seatback, but the seat cushion is fixed. Accordingly, the hips of the lower body are pushed forward on the seat cushion, the waist is spaced apart from the seatback, and the portions of the thighs close to the knees are not supported since the seat cushion is not long enough, so a fatigue reduction posture is unable to be provided.

However, according to the present disclosure, as shown at the right side in FIG. 7, when tipping-up and extension of the seat cushion are finished, the seat cushion may be stretched, and thus, the area covering and supporting the thighs may be increased. Further, the portions of the thighs proximate to the knees may be supported and moved upward and the hips and waist may be naturally brought in close contact with the seat surface by tipping-up in which the front end of the seat cushion is moved up. Therefore, body pressure may be distributed and the passenger may take a fatigue reduction posture similar to a weightless posture (e.g., a comfortable posture with joints relaxed in a weightless state).

Folding of Seatback & Diving of Seat Cushion

Figure 8:
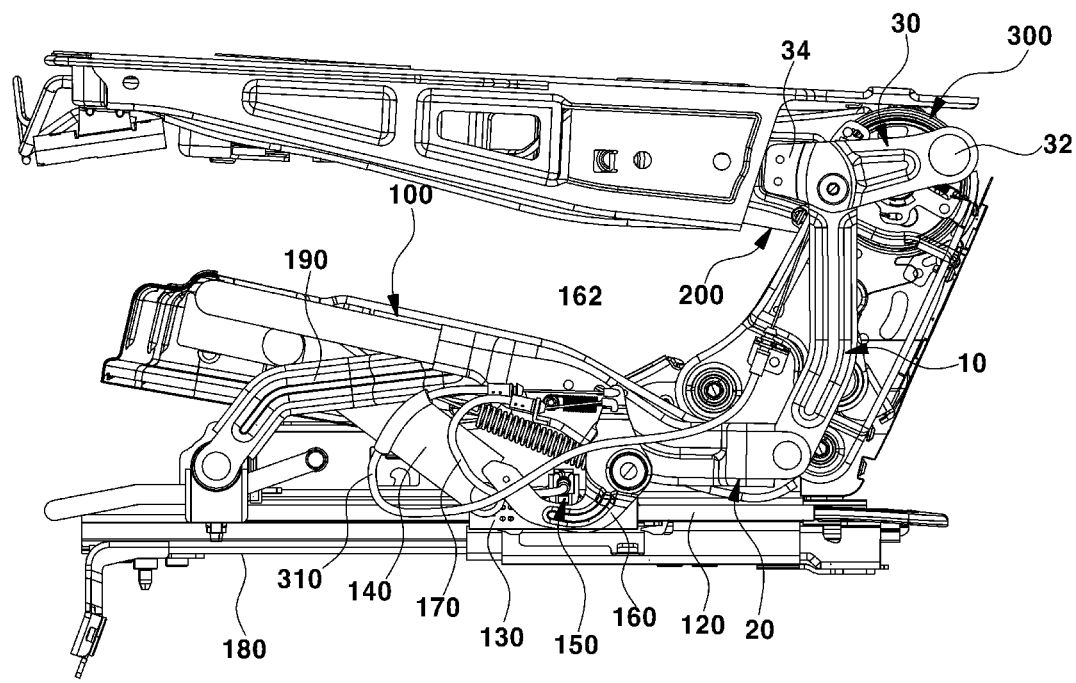
FIG. 8 is a side view showing the state when the fold and dive seat according to an exemplary embodiment of the present disclosure is folded and dived.

FIG. 8 is a side view showing the state when the fold and dive seat according to the present disclosure is folded and dived. The fold and dive seat according to the present disclosure, which is a rear seat, may perform folding in which the seatback is folded or the seat cushion when there is an insufficient loading space (e.g., luggage room) behind the seatback and diving in (e.g., storing downward) which the front portion of the seat cushion is moved down to make the rear surface of the folded seatback horizontal.

First, when a passenger pulls the lever 160, the cable 170 and the reclining cable 310 are pulled, the linear locking device 150 may unlock the slider 130, and the reclining device 300 may be unlocked. In this state, the seatback frame 200 may be folded by being rotated forward over the seat cushion frame 100. As the seatback frame 200 is folded forward, as shown in FIG. 8, the leverage links 30 mounted on the seatback frame 200 may also be rotated forward together with the seatback frame 200. Accordingly, the hinge points between the leverage links 30 and the first dive links 10 may be moved forward and downward. Accordingly, diving may be performed, in which the first dive links 10 are pushed and moved downward, the hinged points between the first dive links 10 and the second dive links 20 are also pulled slightly backward and moved downward, and the seat cushion frame 100 integrated with the second dive links 20 is also pulled slightly backward and moved downward.

When the seat cushion frame 100 dives, that is, is pulled backward and moved downward, the support link for tilting 140 may be declined and pull the slider 130 backward, and thus, the slider 130 may be moved backward along the rail pipe 120 since it is unlocked, as described above. In this state, when the passenger releases the lever 160, the pulled cable 170 may be released and the elastic clamp 150 may be returned to the initial diameter by an elastic restoring force. Accordingly, the inner side of the elastic clamp 150 may be tightened to the outer side of the rail pipe 120 to be in close contact with (e.g., abut) the outer side, and thus, the slider 130 may be locked, and accordingly, the seatback maybe maintained in the folded state and the seat cushion maybe maintained in the dived state.

The present disclosure provides the following effects from the objects described above.

First, it may be possible to provide a fatigue reduction posture, in which body pressure by an upper body and a lower body maybe distributed more uniformly, to a passenger by further mounting a tip up-extension mechanism enabling tipping-up and extension of the front end of a seat cushion other than a fold and dive mechanism and a seatback reclining mechanism for the fold and dive seat so that tipping-up for lifting the front end of the seat cushion and extension for extending the front end forward are performed simultaneously when the seatback reclining is performed.

Second, the tipping-up/extension mechanism of a seat cushion may be operated manually by a passenger pulling a lever for reclining a seatback, so it may be possible to reduce costs by avoiding an electric method that uses an expensive motor.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A fold and dive seat for a vehicle, comprising:
   a seat cushion frame;
   a seatback frame coupled to the seat cushion frame to be capable of reclining;
   a leverage link having an upper end fixed to the seatback frame and a lower end where a push stopper is formed;
   a first dive link and a second dive link, the first dive link having a lower end hinged to the second dive link and an upper end hinged to the leverage link, the second dive link being fixed to a side of the seat cushion frame, and the push stopper being configured to push the first dive link;
   a fixed plate connected between seat rails at both sides thereof;
   a seat cushion support link having an upper end hinged to the second dive link and a lower end hinged to the fixed plate;
   a rail pipe mounted on the fixed plate and disposed in a front-rear direction under the seat cushion frame;
   a slider mounted on the rail pipe to be capable of sliding forward and backward; and
   a support link for tilting, wherein the support link is hinged between a front end of the slider and a front end of the seat cushion frame.

2. The fold and dive seat of claim 1, wherein the leverage link has a vertical bending portion between the upper end fixed to a side of the seatback frame and the lower end where the push stopper is formed.

3. The fold and dive seat of claim 2, wherein the upper end of the first dive link is disposed over and hinged to an inner side of the vertical bending portion, and the push stopper is in contact with a rear surface of the first dive link to be able to push the first dive link.

4. The fold and dive seat of claim 1, further comprising:
   return springs for assisting the seat cushion support link to return to an initial position are connected between the seat cushion support link and the seat rails.

5. The fold and dive seat of claim 1, further comprising:
   a lever mounted on a side of the seat cushion frame;

a linear locking device mounted on the slider to lock or unlock the slider on the rail pipe; and a cable connected between the lever and the linear locking device, wherein when the lever is pulled, the cable is pulled and the linear locking device unlocks the slider, and when the lever is released, the cable returns to an initial position and the linear locking device locks the slider.

6. The fold and dive seat of claim 5, wherein the linear locking device includes:

an elastic clamp having a circular pipe shape with a side open by a slit and disposed between an outer side of the rail pipe and an inner side of the slider; and a pulling plate integrally formed at an end of the elastic clamp and extending to an outer side of the slider, wherein an inner end of the cable is coupled to the pulling plate.

7. The fold and dive seat of claim 6, further comprising:

friction plates disposed on an inner side of the elastic clamp, wherein the friction plates come in contact with or are spaced apart from the rail pipe.

8. The fold and dive seat of claim 5, further comprising:

stoppers configured to limit positions before and after pulling of the pulling plate, wherein the stoppers are integrally formed on an outer side of the slider.

9. The fold and dive seat of claim 5, further comprising:

a reclining cable connected with a seatback reclining device and connected to the lever to be capable of being pulled.

10. A vehicle having a fold and dive seat of claim 1.

* * * * *